United States Patent Office 3,538,003
Patented Nov. 3, 1970

3,538,003
BRAKE FLUIDS
Jakob Lothar, Ludwigshafen (Rhine), Germany, assignor to Badische Anilin- & Soda-Fabrik Aktiengesellschaft, Ludwigshafen (Rhine), Germany
No Drawing. Filed July 18, 1967, Ser. No. 654,052
Claims priority, application Germany, July 27, 1966,
1,594,358
Int. Cl. C09k 3/00, 3/02; C10m 3/26
U.S. Cl. 252—77          2 Claims

ABSTRACT OF THE DISCLOSURE

A brake fluid which contains as essential component 10 to 95% by weight of $\alpha$-methylglutarodinitrile.

---

Brake fluids for automobiles usually contain (a) one or more solvents and (b) one or more lubricants. Such mixtures attract atmospheric moisture to a relatively high degree with the result that the boiling point of the mixtures, which should be as high as possible, is lowered considerably; particularly when using modern disc brakes, this results in the formation of water vapor bubbles and, particularly in the case of repeated braking, may impair the braking effect.

Adipic esters of glycol ethers, which have been proposed as additives to overcome these drawbacks, have the disadvantage either that they cause swelling of the rubber or plastics gaskets of the braking system or, in the case of esters which are miscible with water and only have a slight swelling effect, that they hydralyze upon absorption of water so that the pH value falls into the acid region resulting in serious corrosion.

I have now found new brake fluids which avoid all the abovementioned disadvantages and which contain as essential component 10 to 95% by weight of $\alpha$-methylglutarodinitrile.

The brakes fluids according to this invention preferably consist of (a) solvent and (b) lubricant, the components (a) consisting wholly or partly of $\alpha$-methylglutarodinitrile and the remainder being a saturated aliphatic ether alcohol having a viscosity of less than 1800 centistokes at $-40°$ C., and the component (b) consisting of a saturated aliphatic ether alcohol having a molecular weight of more than 200 and a viscosity of more than 1800 centistokes at $-40°$ C. or a glycol cyanoethyl ether having a viscosity of more than 1800 centistokes at $-40°$ C.

Examples of solvents (a) are saturated aliphatic ether alcohols having molecular weights of more than 100 up to about 250, such as polyglycol ethers, polyalkylene glycols, alkylene glycol ether alcohols and polyalkylene glycol ether alcohols, polypropylene glycol and polypropylene glycol ethers, which may also be used mixed with one another. Esters of adipic acid with n-butanol, amyl alcohol, butyl glycol or butyl diglycol are also suitable. The lubricants (b) may be saturated aliphatic ether alcohols or polyglycols having molecular weights above 200, up to about 6000, for example polyalkylene glycols, polyalkylene glycols ethers, polyhydroxyalkyl ethers of trihydric and higher polyhydric alcohols and castor oil, or polyalkoxylation products of castor oil. Moreover, the esters of adipic acid with triglycol, or adipic acid with propylene glycol or neopentyl glycol, in each case reacted in the ratio of 1:1, are suitable.

The proportion in which the solvent and lubricant are contained in the new brake fluids is usually from 0.1 to 2, particularly 0.3 to 1, parts by weight of lubricant per part by weight of solvent.

The glycol cyanoethyl ethers used as lubricants have a high boiling point, advantageously more than 180° C., and a low pour point, advantageously less than 10° C. specific examples of suitable lubricants are nitriles, for example propylene glycol-bis-cyanoethyl ether, diethylene glycol methylcyanoethyl ether, diethylene glycol ethylcyanoethyl ether, diethylene glycol propylcyanoethyl ether, diethylene glycol butylcyanoethyl ether, triethylene glycol methylcyanoethyl ether, triethylene glycol ethylcyanoethyl ether, triethylene glycol propylcyanoethyl ether and triethylene glycol butylcyanoethyl ether.

The $\alpha$-methylglutarodinitrile is in general added to the abovementioned components in amounts of 10 to 95%, preferably 40 to 85%, by weight. The incorporation of other additives, for examples corrosion inhibitors, such as amines, for example morpholine or cyclohexylamine, or of boric acid esters, such as glyceroboric acid, is possible and in many cases advantageous. The amount of these additives may be up to 10% by weight based on the whole of the brake fluid; larger amounts are possible but usually not necessary.

The new brake fluids are obtained by simply mixing the components together, the order in which they are mixed being arbitrary. They have an adequately wide liquid range, i.e. in general they have a boiling point of more than 180° C., advantageously above 200° C., and a pour point of less than $+10°$ C., advantageously below $-40°$ C. They have adequate stability under conditions of use and do not swell natural or synthetic rubber beyond a certain limit, in general up to about 20%, advantageously up to 10%, by volume. Finally, their pH value does not decline much even under corrosive conditions, for example in the corrosition test according to SAE 70 R 3 in which the liquid containing water is heated for 120 hours at 100° C. $\pm 2°$ C., and in all cases remains above 7.

Water absorption, which has been the main disadvantage of prior art brake fluids, is much less in the case of the new fluids. The new brake fluids therefore constitute a considerable technical advance without any attendant disadvantages.

The invention is illustarted by the following examples in which parts are by weight.

EXAMPLE 1

33.3 parts of $\alpha$-methylglutarodinitrile (which has a boiling point of 274° C. and a viscosity of 490 centistokes at $-40°$ C. and of 1.34 centistokes at $+99°$ C.) is mixed with 66.6 parts of propylene glycol-bis-$\beta$-cyanoethyl ether (having a boiling point above about 335° C. and a viscosity of 4526 centistokes at $-40°$ C. and of 2.32 centistokes at $+99°$ C.). 0.3 part of dibutylethanolamine is added to inhibit corrosion. The brake fluid thus obtained has a viscosity of 1560 centistrokes at $-40°$ C. and of 1.93 centistokes at $+99°$ C. and a boiling point of 295° C.; in the swelling test it increases the volume of natural rubber by 1.02% after 120 hours at 70° C. In the corrosion test (carried out according to SAE 70 R 3) the pH value falls from 10.4 (before the test) to 9.5 (after the test). In the freezing (fluidity and appearance at low temperature according to SAE 70 R 3 at $-51°$ C. and six hours) it meets all the requirements.

To determine hygroscopicity, 25 parts of the mixture is stored for four weeks in a Petri dish at room temperature in a closed vessel over water; it absorbs 1.075 parts (=4.3% by weight) of water. Under the same conditions, a prior art brake fluid (based on glycol ether) increases in weight by 26.98 parts (=107.8% by weight).

EXAMPLE 2

59 parts of $\alpha$-methylglutarodinitrile is mixed with 26 parts of triethylene glycol monobutyl ether and 15 parts of polyvinyl methyl ether having a K value of about 20, 0.3 part of morpholine and 0.05 part of N-methyldipropylene triamine disalicyligene (reaction product of N-methyldipropylene triamine with salicylaldehyde). The mixture has a viscosity of 1350 centistokes at −40° C., of 8.0 centistokes at +37° C. and 2.2 centistokes at +99° C., and a boiling point of 267° C. It increases the volume of a natural rubber gasket by 6.83% after 120 hours at 70° C. and its pH value drops from 10.0 to 8.8 in the corrosion test. The liquid satisfies the requirements of the water tolerance test (carried out according to SAE 70 R 3). In the hygroscopicity test caried out according to Example 1 water absorption is 20.3% by weight.

EXAMPLE 3

78 parts of α-methylglutarodinitrile, 17 parts of the polyalkylene glycol obtained by the action of a mixture of 1760 parts of ethylene oxide and 1450 parts of propylene oxide on 76 parts of propylene glycol, 5 parts of triethylene glycol monobutyl ether, 0.3 part of morpholine and 0.05 part of N-methyldipropylene triamine disalicyligene are mixed together. The mixture obtained has a viscosity of 1570 centistokes at −40° C., of 3.1 centistokes at 99° C., a boiling point of 271° C. and satisfies the requirements of the water tolerance test, which is carried out for twenty-four hours at −40° C., and gives particularly good results in the corrosion test according to SAE 70 R 3.

In the hygroscopicity test carried out according to Example 1 water absorption is 13.5% by weight.

EXAMPLE 4

56 parts of α-methylglutarodinitrile, 25 parts of triethylene glycol monobutyl ether and 19 parts of the reaction product of a mixture of 2000 parts of ethylene oxide and 1000 parts of propylene oxide with 1500 parts of the triglyceride of ricinoleic acid are mixed together; 0.3% by weight (based on the total mixture) of morpholine is added. The mixture has a viscosity of 1620 centistokes at −40° C., of 2.5 centistokes at +99° C., a boiling point of 269° C. and meets the requirements of the water tolerance test and corrosion test according to SAE J 70 b–70 R 3.

In the hygroscopicity test carried out according to Example 1 water absorption is 19.5% by weight.

EXAMPLE 5

40 parts of α-methylglutarodinitrile, 40 parts of triethylene glycol butylethyl ether (prepared by vinylation and subsequent hydrogenation of butyl triglycol), 20 parts of polyalkylene glycol (prepared by the action of a mixture of 25 moles of ethylene oxide and 50 moles of propylene oxide on 1 mole of propylene glycol), 0.3 part of dibutylethanolamine, 0.1 part of benzotriazole and 0.05 part of the reaction product of 2 moles of salicylaldehyde and 1 mole of N-methyldipropylene diamine are mixed together. The brake fluid thus obtained has the followig properties:

Test according to SAE J 70 b–70 R 3:
  Viscosity at −40° C.=1094 centistokes
  Boiling point=262° C.
   boiling point variation=−3° C.
  Water tolerance test=clear, flows immediately
   (24 hours at −40° C.)
  pH value=9.4
  Swelling of natural rubber gasket having a diameter
   of 1.25 inch (120 hours at +70° C.)=1.13 mm.
   on the bottom diameter, or 12.51% by volume.
Corrosion values:
  Tin plate ±0.000 mg./sq. cm.
  Steel +0.007 mg./sq. cm.
  Aluminum +0.003 mg./sq. cm.
  Cast iron −0.017 mg./sq. cm.
  Brass −0.066 mg./sq. cm.
  Copper −0.366 mg./sq. cm.
  pH value after corrosion test=8.7.

In a hygroscopicity test carried out at 60% relative humidity water absorption is 4% by weight whereas that of brake fluids based on glycols ether without cyano compounds is from 13 to 15% by weight.

EXAMPLE 6

15 parts of dibutyl glycol adipate, 11 parts of n-butyl adipate, 1 part of neopentyl glycol adipate, 14 parts of triglycol adipate, 58 parts of methylglutarodinitrile, 0.5 part of dibutylethanolamine, 0.1 part of benzotriazole, 0.05 part of the reaction product of 2 moles of salicyaldehyde and 1 mole of N-methyldipropylene diamine, 0.5 part of 2,2-(p-hydroxyphenyl)-propane and 0.5 part of phenothiazine are mixed together.

The brake fluid thus obtained has the following properties:

Viscosity at −40° C.—1710 centistokes
Viscosity at +20° C.—20.9 centistokes
Viscosity at +37.8° C.—11.4 centistokes
Viscosity at +99° C.—3.2 centistokes
Specific gravity D20/4—0.9912
Boiling point—273° C.
Boiling point variation—+4° C.
pH value SAE—8.6
Flash point—150° C.

freezing test (six hours at −51° C.) clear, flows immediately; cold test (six days at −40° C.) clear, flows immediately; water absorption after three days storage over water 2.3%.

I claim:
1. A brake fluid consisting essentially of a solvent portion consisting wholly or partly of α-methylglutarodinitrile in an amount of 10–95% by weight of said brake fluid, any remainder of said solvent portion being saturated aliphatic ether alcohols having a viscosity of less than 1800 centistokes at −40° C., and a lubricant portion consisting of saturated aliphatic ether alcohols having a molecular weight of more than 200 and a viscosity of more than 1800 centistokes at −40° C. or of glycol cyanoethyl ethers having a viscosity of more than 1800 centistokes at −40° C., and proportions thereof being 0.1 to 2 parts by weight of said lubricant portion per part by weight of said solvent portion.

2. A brake fluid consisting essentially of a solvent portion consisting wholly or partly of α-methylglutarodinitrile in an amount of 10 to 95% by weight of said brake fluid, any remainder of said solvent portion being saturated aliphatic ether alcohols having a viscosity of less than 1800 centistokes at −40° C., and a lubricant portion consisting of glycerol triricinoleate, and proportions thereof being 0.1 to 2 parts by weight of said lubricant portion per part by weight of said solvent portion.

References Cited

UNITED STATES PATENTS

| | | | |
|---|---|---|---|
| 2,803,605 | 8/1957 | Doelling et al. | 252—79 |
| 2,836,613 | 5/1958 | Heininger | 260—465.6 |
| 3,206,498 | 9/1965 | Schreyer | 260—465.8 |
| 3,223,631 | 12/1965 | Morway et al. | 252—33.6 |

MAYER WEINBLATT, Primary Examiner

D. SILVERSTEIN, Assistant Examiner

U.S. Cl. X.R.

252—50, 51.5